US008717298B2

(12) United States Patent
Nash et al.

(10) Patent No.: US 8,717,298 B2
(45) Date of Patent: *May 6, 2014

(54) SCROLLING BEHAVIOR-INFLUENCED ALGORITHM SELECTION TO FACILITATE ADAPTIVE SCROLLING

(71) Applicant: Varia Holdings LLC, Brooklyn, NY (US)

(72) Inventors: Paul R. Nash, Bellevue, WA (US); Peter Zatloukal, Seattle, WA (US)

(73) Assignee: Varia Holdings LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,821

(22) Filed: Nov. 1, 2012

(65) Prior Publication Data

US 2013/0061168 A1    Mar. 7, 2013

Related U.S. Application Data

(63) Continuation of application No. 13/152,650, filed on Jun. 3, 2011, now Pat. No. 8,325,139, which is a continuation of application No. 11/540,126, filed on Sep. 29, 2006, now Pat. No. 7,978,177.

(51) Int. Cl.
*G09G 5/08* (2006.01)
*G06F 3/033* (2013.01)

(52) U.S. Cl.
USPC .......................................... 345/163; 345/156

(58) Field of Classification Search
USPC ......... 345/156, 157, 163, 164, 167, 168, 173; 715/784, 785
See application file for complete search history.

(56) References Cited

U.S. PATENT DOCUMENTS

| 5,313,229 | A  | 5/1994  | Gilligan et al. |
| 5,530,455 | A  | 6/1996  | Gillick et al. |
| 5,633,657 | A  | 5/1997  | Falcon |
| 7,212,189 | B2 | 5/2007  | Shaw et al |
| 7,277,084 | B2 | 10/2007 | Hinckley et al. |

OTHER PUBLICATIONS

International Search Report and Written Opinion mailed Apr. 2, 2008 for PCT Application No. PCT/US07/77438, 7 pages.
International Preliminary Report on Patentability mailed Mar. 31, 2009 for PCT Application No. PCT/US07/77438, 4 pages.

*Primary Examiner* — Ricardo L Osorio
(74) *Attorney, Agent, or Firm* — Schwabe, Williamson & Wyatt, P.C.

(57) ABSTRACT

Methods, apparatuses, and articles for receiving one or more input factors associated with scrolling behavior of a user are described herein. Based on the received one or more input factors, at least one of (1) a tunable scrolling algorithm and (2) one or more non-linear scrolling algorithms of a plurality of non-linear scrolling algorithms may be selected for use in evaluating the scrolling behavior of the user.

20 Claims, 3 Drawing Sheets

SCROLLING BEHAVIOR-INFLUENCED ALGORITHM SELECTION TO FACILITATE ADAPTIVE SCROLLING

CROSS REFERENCE TO RELATED APPLICATION

This application is a continuation of U.S. patent application Ser. No. 13/152,650, filed on Jun. 3, 2011, which is a continuation of U.S. patent application Ser. No. 11/540,126, filed Sep. 29, 2006 and issued on Jul. 12, 2011 as U.S. Pat. No. 7,978,177, both of which are entitled "SCROLLING BEHAVIOR-INFLUENCED ALGORITHM SELECTION TO FACILITATE ADAPTIVE SCROLLING," and which are herein incorporated by reference in their entirety.

TECHNICAL FIELD

Embodiments relate to the field of data processing, in particular, to methods and apparatuses for selecting, based on input factors, at least one of a tunable scrolling algorithm and one or more scrolling algorithms of a plurality of scrolling algorithms.

BACKGROUND

Advancements in computer technology have led to a proliferation of client devices capable of browsing, navigating, and/or modifying content made visible through a display of the client device, using an input device. Often, a movement of an input device, such as a movement of a mouse or a slide wheel on a mouse, or of an arrow on a keyboard, may correlate to a degree of movement within content. This movement may be of the type known as scrolling. A common example of scrolling is browsing through a document too large to be totally displayed at once, where only some portion of the document is visible at a given time, and the scrolling changes the visible portion to a different portion showing more of the document above and less below, or less of the document above and more below.

Input devices that accept a scrolling method of user input are often associated with a scrolling algorithm to map units of scroll movement captured by movement-registering sensors of the devices to units of scroll motion affecting the displayed content. Often the scrolling algorithm used is a linear algorithm where N units of registered scroll movement result in F(N) units of determined scroll motion affecting the displayed content, where F(N) is of the form F(N)=mN, and m is a real number. Many scrolling input devices also implement "ballistic" or non-linear scrolling algorithms to achieve an acceleration of the scrolling effects. With such algorithms, for example, the longer the user provides scrolling input, the faster the user will scroll through a document.

Laptop computers are known to contain a user interface coupled to a tunable algorithm allowing users to modify one aspect of the scrolling behavior associated with scrolling usage of a laptop touchpad. Only that aspect (scroll sensitivity) may be modified however, and that modification requires input from the user.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
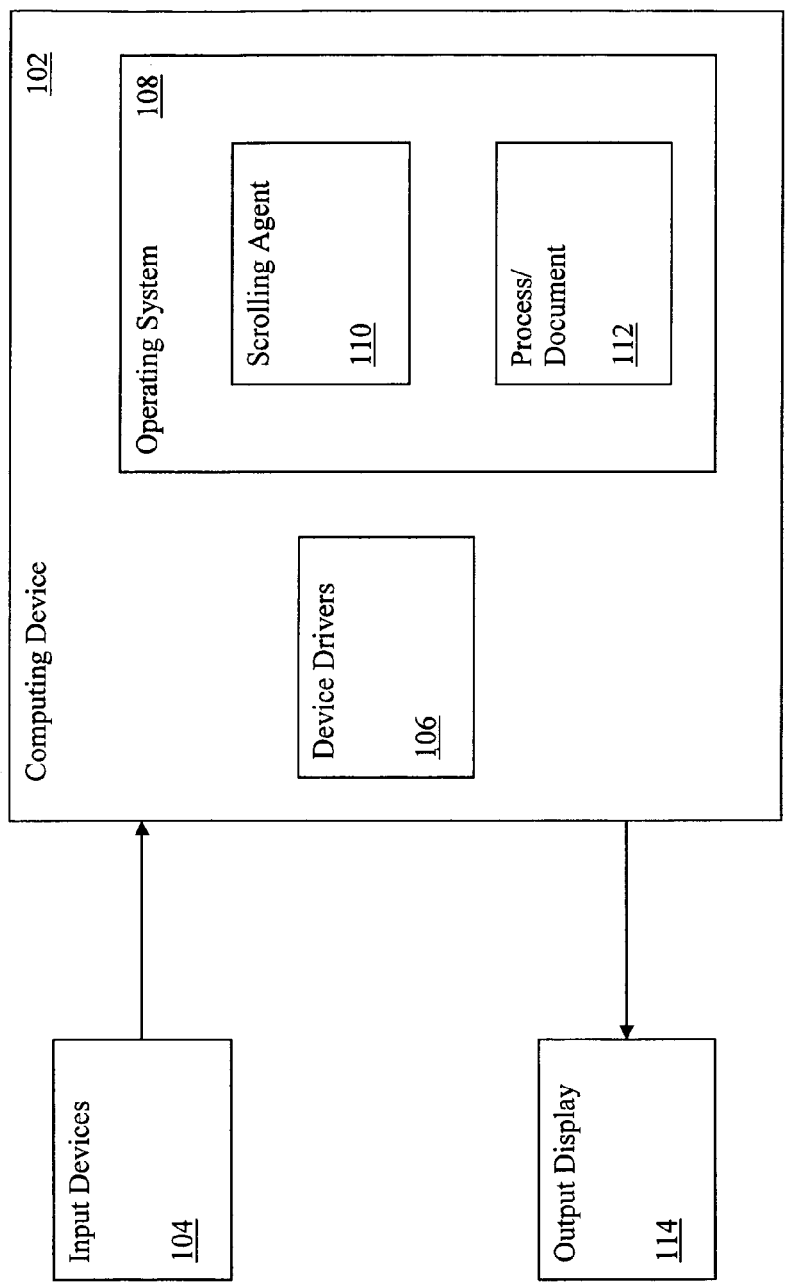
FIG. 1 illustrates an overview of various embodiments of the present invention, selecting at least one scrolling algorithm based on received input factors.

Illustrative embodiments of the present invention include, but are not limited to, methods and apparatuses for receiving one or more input factors associated with scrolling behavior of a user. Based on the received one or more input factors, at least one of (1) a tunable scrolling algorithm and (2) one or more non-linear scrolling algorithms of a plurality of non-linear scrolling algorithms may be selected for use in evaluating the scrolling behavior of the user.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "scrolling" is meant generally to describe "a user input action indicating their desire to express motion in traversing a process or document to the interpreting software." Although common in the art, in this document "scrolling" does not specifically mean that a linear or one-dimensional motion is required from the user, nor does it necessarily translate into only one degree of data in the user interface. "Scrolling" could be any motion which may be interpreted by a scrolling agent, including linear motion in any direction, and non-linear two-dimensional motions such as circular, rectangular, or other geometric gestures (For example, a gesture such as a loop that crosses itself (open infinity) could mean "go to end", and this could be gestured in a single stroke after linear or circular scrolling has begun).

Additionally, although discussed for the sake of illustration in the descriptions below, the act of "scrolling" does not only apply to lists or other data organized in a substantially one-dimensional manner, but may apply to datasets or process/document visualizations where two or more dimensions are represented (such as a spreadsheet or web page in two dimensions, or a desktop or game-user interface that makes use of three dimensions).

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of various embodiments of the present invention, selecting at least one scrolling algorithm based on received input factors. As illustrated, a scrolling agent 110 of a computing device 102 may be adapted to select a tunable scrolling algorithm or to select one or more of a plurality of non-linear scrolling algorithms. The scrolling agent 110 may determine the selected algorithm(s) based at least on one or more input factors associated with the scrolling behavior of a user. Such input factors may include the length of a list presented by a process/document 112 being scrolled, a duration or direction of a scrolling motion, etc. The input factors may be determined by the scrolling agent 110, by a device driver 106 of an input device 104, or by some other process. On determining a tunable scrolling algorithm, the scrolling agent 110 may then tune the algorithm based on the input factors. The scrolling agent 110 may feed scroll inputs registered by the input device 104 and device driver 106 to the selected equation to evaluate the scrolling behavior of the user. The process/document 112 being displayed by the output display 114 may then reflect the scrolling movement determined by the scrolling agent 110 through the selected algorithm(s).

In various embodiments, either or both of the input devices 104 and the output display 114 may be locally coupled to the computing device 102 through, for example, a parallel or USB connector. In other embodiments, one or both of devices 104 and display 114 may be coupled to computing device 102 via a networking fabric (not shown), such as a LAN, a WAN, or the Internet. In one embodiment, the output display 114 may also be an input device 104, such as a touch sensitive display. Also, scrolling agent 110 may be a user-level process of an operating system 108 of the computing device 102, the operating system 108 having one or more processes/documents 112. In other embodiments, the scrolling agent 110 may be hidden from the operating system 108 and may be an integrated part of one or more device drivers 106. In yet other embodiments, the scrolling agent 110 may be implemented in an application specific integrated circuit ("ASIC") or a microcontroller (not shown) communicatively coupled to the device drivers 106.

Figure 3:
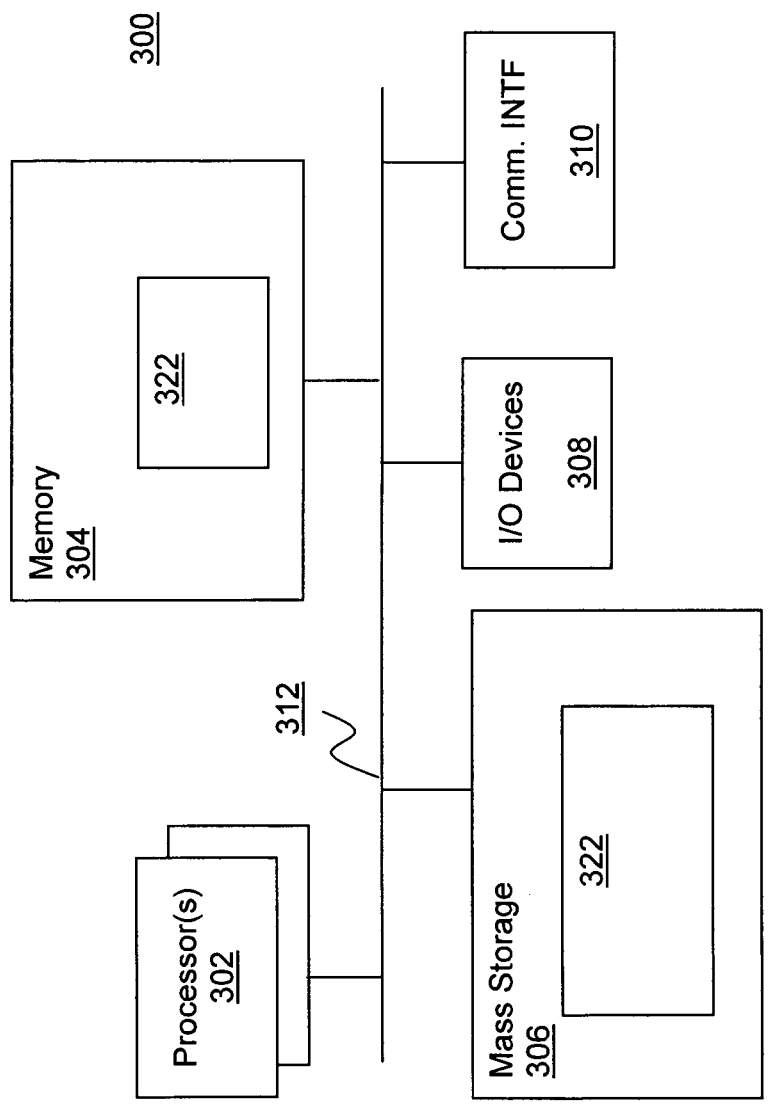
FIG. 3 illustrates an example computer system suitable for use to practice various embodiments of the present invention.

As is shown, a computing device 102 may be coupled to one or more input devices 104 and an output display 114, and may include device drivers 106 for those devices. The computing device 102 may also include an operating system 108 having one or more processes/documents 112 capable of having their contents scrolled, and a scrolling agent 110 capable to determining scrolling movements. Except for the scrolling agent 110 and device drivers 106, the computing device 102 may be any sort of computing device known in the art, such as a personal computer (PC), a workstation, a server, a router, a mainframe, a modular computer within a blade server or high-density server, a personal digital assistant (PDA), an entertainment center, a set-top box or a mobile device. Further, computing device 102 may be any single- or multi-processor or processor core central processing unit (CPU) computing system known in the art. An exemplary single-/multi-processor or processor core computing device 102 is illustrated by FIG. 3, and is described in greater detail below.

In various embodiments, input devices 104 may include any input devices known in the art capable of registering units of scrolling motion. Numerous input devices 106 of this sort are known in the art, such as computer mice, keyboards with scrolling arrows (or keys programmable to serve that purpose), touch pads, scrolling ball devices, remote controls, embedded or attachable computing device 102 keys programmed or programmable to register scrolling movement, and touch sensitive displays (including, for example, output display 114). Such input devices 104 may register scrolling movement in any manner known in the art, including mechanical, electrical, or optical means well known to those skilled in the art, and may provide their associated device drivers 106 with the registered movements. As mentioned above, the input devices 104 may be coupled to the computing device 102 comprising their associated device drivers 106 either locally or remotely, via a networking fabric, which may be a wired or wireless networking fabric.

As illustrated, an output display 114 may also be connected to computing device 102 to display processes/documents 112 of the computing device 102 and to visually reflect the scrolling movements made by users of input devices 104. The output display 114 may be any sort of output display 114 known in the art, such as a CRT computer monitor or an LCD flat panel display, among others. As mentioned above, the output display 114 may be locally coupled to the computing device 102, or may be remotely coupled via a wired or wireless networking fabric. In one embodiment, the output display 114 may further serve as an input device 104, capable of registering scrolling movement of a user and of notifying its associated device driver 106 of the movement. Such an output display 114 may be a touch sensitive display of the sort known in the art that is capable of receiving scroll movement that the user may register on a surface of the output display, either by hand of by some other device.

In some embodiments, the computing device may comprise an operating system 108. The operating system 108 may be any sort of operating system known in the art, such as a Windows operating system of the Windows family of operating systems of the Microsoft Corporation of Redmond, Wash., a UNIX-based operating system, etc. Operating system 108 may manage the scheduling and display of a plurality of processes, a number of the processes capable of displaying contents, such as documents. Included among the processes may be a scrolling agent 110 and one or more processes/documents 112 having contents that may be transitioned among by scrolling motion. Operating systems such as operating system 108 (except for scrolling agent 110) are well known in the art, and accordingly will not be described further.

As is shown, the computing device 102 may further include one or more device drivers 106, each device driver 106 associated with one or more input devices 104. The one or more device drivers 106 may, in some embodiments, be firmware components hidden from the operating system 108 capable of receiving and tabulating data registered by the input devices 104. Except for the removal of scrolling movement mapping, herein performed by scrolling agent 110, device drivers 106 may be like any other device drivers known in the art. Typically, device drivers utilize a single linear or non-linear scrolling algorithm to map scrolling movements registered by the input devices to units of scrolling movement affecting which contents are displayed. Device drivers 106, however, do not perform this mapping, instead relying on scrolling agent 110 to map registered scrolling movements to units of scrolling movement affecting the visual display.

Device drivers 106 may receive a plurality of metrics from input devices 104, such as a number of units of movement registered (the units used varying from input device to input device), and a direction of the movement/scrolling motion. From these metrics, device drivers 106 may calculate a number of other metrics, such as a time duration of the scrolling motion. The modules of the device drivers 106 performing the receiving and calculating may be referred to as adaptive engines. Units of scrolling movement may then be input to a scrolling algorithm selected by the scrolling agent 110, and the other metrics received from the input devices 104 and calculated by the device drivers 106 may be used as input factors by the scrolling agent 110 in selecting the scrolling algorithm. The device drivers 106 may be communicatively coupled to the scrolling agent 110, either directly or indirectly through the operating system 108 or through other hardware devices such as bus aggregators or broadcasters, etc. In one embodiment, scrolling agent 110 may be an integrated module of the device drivers 106, enhancing the operations of the adaptive engine described above with the functions of the scrolling agent 110 described below.

In various embodiments, processes/documents 112 may be any sort of content or content-provisioning application known in the art, wherein scrolling motion may be used to view the entire contents of a process/document 112 or to select one or a list of options. Process/document 112 may be an operating system 108 menu, a word-processing document, a spreadsheet, a table of a database, a slide show, a web page, or any other sort of process/document. Also, process/document 112 may or may not wrap text. In some embodiments, scrolling agent 110 may be adapted to determine a length or size of contents of the process/document 112. Also, processes/documents 112 may further include user interface-based controls allowing users to set and adjust input factors, such as the scrolling sensitivity and speed reflected in the displayed output of other processes/documents 112 being scrolled. In some embodiments, scrolling agent 110 may be adapted to receive additional descriptive metadata about the contents of the process/document 112, such as noteworthy bookmarks or "ratchet points" which should be considered when adapting the scrolling speed. One such example could be a metadata set describing the beginning entry index of each letter of the alphabet within an alphabetized list. This information could be used to cap the scrolling speed and guarantee that each letter shows up on the screen (since a user is often searching for a letter). Other examples might include breakdowns of album boundaries with a list of tracks by an artist, digit boundaries in a sorted list of numbers, hour/day/week/month type boundaries in a sorted list of dates, etc.

As illustrated, computing device 102 may also comprise a scrolling agent 110 adapted to receive input factors, select a scrolling algorithm based on the input factors, and evaluate scrolling behavior of a user by using the selected scrolling algorithm. In some embodiments, the scrolling agent 110 may be a user-level component of the operating system 108 while, in other embodiments, the scrolling agent 110 may be an integrated component of one or more device drivers 106, thus hidden from the operating system 108.

The scrolling agent 110 may receive the input factors associated with the scrolling behavior of a user from a number of other processes. A number of factors, such as a time duration of scrolling movement, a direction of scrolling motion, an input movement speed, and a movement direction, may be received from the one or more device drivers 106, as described above. In some embodiments, the device drivers 106 may automatically provide the input factors to the scrolling agent 110 while, in other embodiments, the device drivers 106 may only provide the input factors in response to a request from the scrolling agent 110. Also, the scrolling agent 110 may obtain metrics regarding the content to be scrolled from the processes/documents 112 having the content, as is described above. Such metrics may include a length of the content or a size, such as a number of items in a list. Other such metrics may include metadata about the organization of the processes/documents 112 being traversed. Additional input factors may further be obtained from user interface-based controls, such as a user interface with a series of scrolling settings which may be set by a user. Input factors may be obtained from any source, however, not simply those discussed above.

Upon receiving the input factors, the scrolling agent 110 may select at least one of a 1) tunable scrolling algorithm and 2) one or more non-linear scrolling algorithms of a plurality of non-linear scrolling algorithms, based at least in part on one or more of the one or more input factors. Also, the computing device 102 need not have both a tunable scrolling algorithm and a plurality of non-linear scrolling algorithms. For example, the computing device 102 might have only a tunable scrolling algorithm. Upon receiving the input factors, then, the scrolling agent 110 may select the tunable scrolling algorithm and may utilize the input factors to adjust one or more settings of the algorithm, such as a scrolling speed, a scrolling sensitivity, and a scrolling time period. Thus, if the input factor is a scrolling speed, the scrolling agent 110 may adjust the scrolling speed of the tunable scrolling algorithm upon selecting the algorithm.

In other embodiments, the computing device 102 may have only a plurality of non-linear scrolling algorithms for the scrolling agent 110 to select from. A non-linear scrolling algorithm may, for example, allow continued scrolling motion by a user over time at the same pace to result in an accelerated scrolling of the displayed content. Different of the plurality of non-linear scrolling algorithms may, for instance, have different accelerations. For instance, the algorithm selected by the scrolling agent 110 may vary based on a size of a list in the displayed content, with a larger size associated by the scrolling agent 110 with an algorithm having a higher acceleration of scrolling motion, and visa versa. Such an association may be made statically, based on a table mapping sizes to algorithms, or dynamically, based on other criteria. The other input factors may also be taken into account by the scrolling agent 110 in selecting the non-linear scrolling algorithms. For example, a longer scrolling duration may result in the selection of a non-linear scrolling algorithm with a higher acceleration of scrolling motion.

In other embodiments, the computing device 102 may have both a tunable scrolling algorithm and a plurality of non-linear scrolling algorithms. In such embodiments, the scrolling agent 110 may select an appropriate algorithm based on the input factors in the manner described above, associating magnitudes of certain factors with certain algorithms. Also, algorithms may additionally be associated with certain input devices. For example, the tunable scrolling algorithm may be associated with a user interface-based control, and a computer mouse may be associated with the plurality of non-linear scrolling algorithms. In such embodiments, the scrolling agent 110 may determine the source of the scrolling motion and input factors describing the motion, and may use such data in selecting the appropriate scrolling algorithm to evaluate user scrolling behavior.

Scrolling agent 110 may further include a learning algorithm capable of predicting scrolling behavior of users based on the input factors, and may thus be used by the scrolling agent 110 to select an appropriate scrolling algorithm. The learning algorithm may be used to evaluate input factors in light of each other to develop a better sense of the scrolling behavior of a user. For example, the learning algorithm may note that, among input factors, rapid scrolling in one direction for a period of time is usually followed by a short period of scrolling in the opposite direction. From this the learning algorithm may deduce that the user corrects him/her/itself. Subsequently, upon receiving input factors including rapid scrolling in one direction for the period of time, the learning algorithm may determine a non-linear scrolling algorithm with a lesser acceleration or a lower speed setting for the tunable scrolling algorithm, based on its previous evaluations that the user scrolls too fast and has to correct. Accordingly, the learning algorithm may facilitate the scrolling agent 110 in selecting an even more appropriate scrolling algorithm. As another example, the learning algorithm may be tuned to detect movement factors unique to the current user of the device and then select an appropriate scrolling algorithm or tuning set based on that user's particular pattern of motion.

In various embodiments, after selecting the appropriate scrolling algorithm, the scrolling agent 110 may evaluate the scrolling behavior of the user. Evaluating the scrolling behavior may include inputting the scrolling movement registered by the input device 104 and received by the device driver 106 to the selected scrolling algorithm and outputting the units of scrolling movement affecting the displayed content to the appropriate process 112 rendering the content. The process 112 may then render content to the output display 114 reflecting the scrolling motion input by the user in light of the selected scrolling algorithm.

Figure 2:
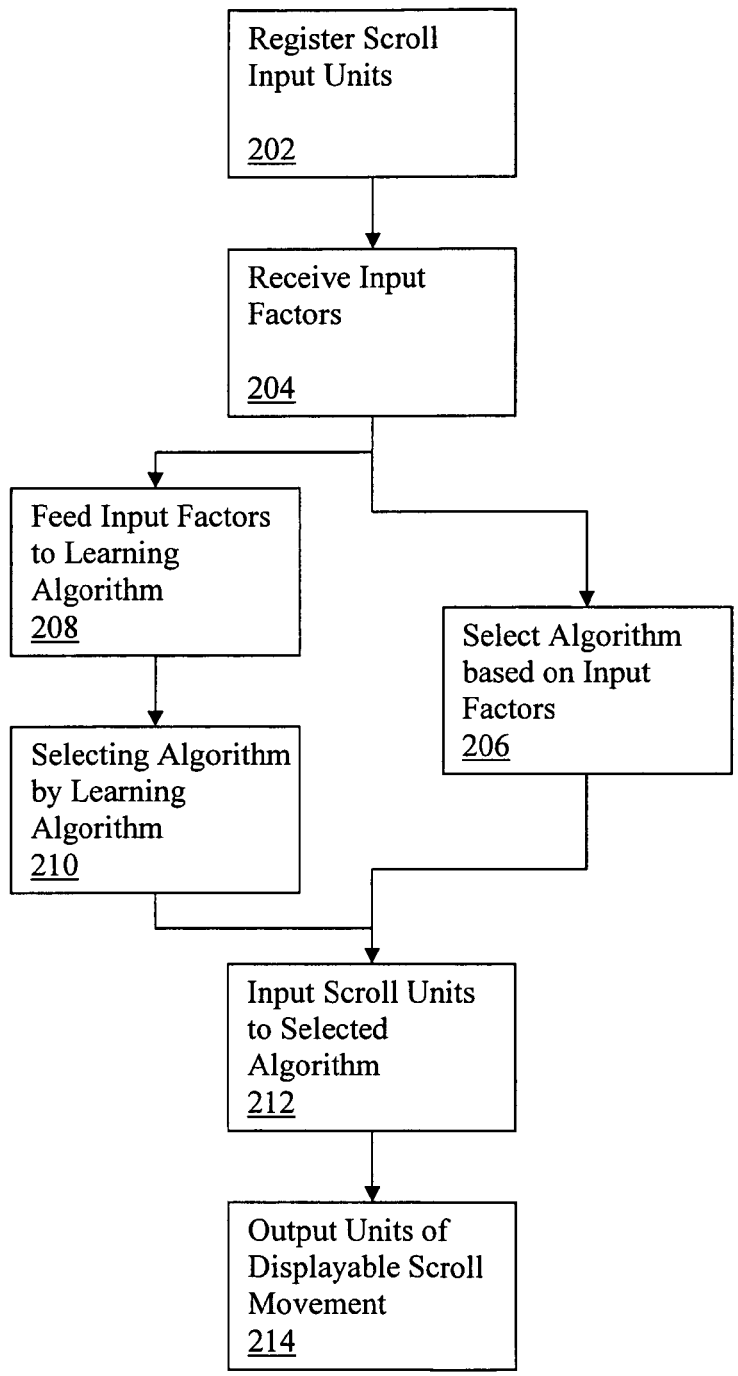
FIG. 2 illustrates a flow chart view of selected operations of the methods of various embodiments of the present invention.

FIG. 2 illustrates a flow chart view of selected operations of the methods of various embodiments of the present invention. As illustrated, in some embodiments, an adaptive engine of a device driver of a computing device may receive units of scrolling movement input registered by an input device associated with the device driver, block 202. The input device may be locally or remotely coupled to the computing device, in the manner described above, and may register units of scroll movement, scrolling speed, and direction. Upon registering these metrics, the input device may provide the metrics to the associated device driver of the computing device. A user may register such units of movement by, for example, moving a wheel on a computer mouse, moving the computer mouse, or moving an arrow key of a keyboard.

Upon receipt of the metrics by the device driver, a scrolling agent of the computing device may receive one or more input factors associated with the scrolling behavior of a user, block 204. As discussed above, the scrolling agent may be a user-level process of the operating system of the computing device, or may be a component process of the device driver. The scrolling agent may receive input factors from the device driver, including scrolling speed and direction, movement direction, and a time duration over which a scrolling motion occurred (such a time may have been calculated by the adaptive engine of the device driver above from the received metrics). The scrolling agent may further receive as input factors a length or size of contents being scrolled from a process of the computing device, or may receive settings for scrolling speed, sensitivity, and duration as input factors from a user interface-based control of the computing device.

As is shown, the scrolling agent may next select at least one of 1) a tunable scrolling algorithm and 2) one or more non-linear scrolling algorithms of a plurality of non-linear scrolling algorithms based at least in part on one or more of the received input factors, block 206. In some embodiments, the computing device may only have the tunable scrolling algorithm, may select that algorithm automatically upon receiving input factors, and may tune one or more settings of the tunable scrolling algorithm based on the received input factors. In other embodiments, the computing device may have only a plurality of non-linear scrolling algorithms, and may select an algorithm based on an input factor. For example, the input factor may be a magnitude of scrolling speed, and that magnitude may be associated with a non-linear scrolling algorithm having a certain scrolling acceleration. In yet other embodiments, the computing device may have both tunable and non-linear scrolling algorithms, and algorithms may be associated with specific input devices in addition to magnitudes of input factors. For example, a tunable scrolling algorithm may be associated with a user interface-based control, and a plurality of non-linear scrolling algorithms may be associated with a computer mouse. Also, if multiple dimensions of scrolling motion are registered by the input device, a different scrolling algorithm may be determined and associated with each dimension in the manner described above.

In various embodiments, the above described scrolling agent may comprise a learning algorithm adapted to receive the input factors as variables capable of modifying predicted scrolling behavior predicted by the learning algorithm, and of selecting, by the learning algorithm, the above described scrolling algorithms(s), blocks 208-210. The learning algorithm may be used to evaluate input factors in light of each other to develop a better sense of the scrolling behavior of a user. For example, the learning algorithm may note that, among input factors, rapid scrolling in one direction for a period of time is usually followed by a short period of scrolling in the opposite direction. From this the learning algorithm may deduce that the user corrects him/her/itself. Subsequently, upon receiving input factors including rapid scrolling in one direction for the period of time, the learning algorithm may determine a non-linear scrolling algorithm with a lesser acceleration or a lower speed setting for the tunable scrolling algorithm, based on its previous evaluations that the user scrolls too fast and has to correct. Accordingly, the learning algorithm may facilitate the scrolling agent in selecting an even more appropriate scrolling algorithm, block 210.

Also, as is shown, upon selecting the scrolling algorithm(s), the scrolling agent may evaluate the scrolling behavior of the user, including inputting received units of scroll input to the selected at least one algorithm and outputting units of displayable scrolling movement, blocks 212-214. The scrolling agent, receiving the units of scrolling movement registered by the input devices, may input the units to the selected scrolling algorithm(s), block 212. The selected scrolling algorithm(s) may then output units of scrolling movement affecting the scrolling display of the contents, block 214. The output units may be provided to the process currently displaying the contents being scrolled. Accordingly, the scrolling agent may utilize the selected scrolling algorithm(s) to effectively map registered units of scrolling input to units of scrolling output affecting the displayed content.

FIG. 3 illustrates an example computer system suitable for use to practice various embodiments of the present invention. As shown, computing system 300 includes a number of processors or processor cores 302, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CDROM) and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown).

Each of these elements performs its conventional functions known in the art. In particular, system memory 304 and mass storage 306 may be employed to store a working copy and a permanent copy of the programming instructions implementing all or a portion of earner described functions of the scrolling agent, device drivers, and so forth, herein collectively denoted as 322. The instructions 322 may be assembler instructions supported by processor(s) 302 or instructions that can be compiled from high level languages, such as C.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having instructions 322 may be employed to distribute the instructions 322 and program various computing devices.

In another embodiment, not shown, programming instructions implementing all or a portion of earner described functions of the scrolling agent, device drivers, and so forth may be included in one or both of an ASIC and a microcontroller, the ASIC and/or microcontroller communicatively coupled to one or more of elements 302-312.

The constitution of these elements 302-312 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
receiving, by a computing device, one or more input factors associated with scrolling behavior of a user; and
selecting, by the computing device, based on at least one of the one or more input factors, a scrolling algorithm out of a plurality of scrolling algorithms, the plurality of scrolling algorithms including: (1) a tunable scrolling algorithm and (2) one or more non-linear scrolling algorithms of a plurality of non-linear scrolling algorithms for use in evaluating the scrolling behavior of the user.

2. The method of claim 1, wherein the one or more input factors are selected from the group consisting of a length of a list to be scrolled, a time of a scrolling motion, a direction of the scrolling motion, an input movement speed, a movement direction, and descriptive metadata about contents to be scrolled.

3. The method of claim 2, wherein the descriptive metadata include at least one from the group consisting of a ratchet point of the contents to be scrolled, an entry index of each letter of an alphabet within an alphabetized list to be scrolled, a content/type boundary in the list to be scrolled, and a description of an organization of the contents to be scrolled.

4. The method of claim 1, wherein the tunable scrolling algorithm is capable of adjusting at least one of a scrolling speed, a scrolling sensitivity, and a scrolling time period.

5. The method of claim 1, further comprising evaluating, by the computing device, the scrolling behavior of the user, including outputting units of displayable scroll movement based on inputting received units of scroll input to the selected at least one algorithm.

6. The method of claim 1, wherein said selecting the at least one algorithm comprises selecting, by a learning algorithm capable of predicting the scrolling behavior of the user, the at least one algorithm.

7. The method of claim 6, further comprising receiving, by the computing device based on the learning algorithm, the one or more input factors as variables capable of modifying the predicted scrolling behavior predicted by the learning algorithm.

8. An apparatus comprising:
a processor; and
a scrolling agent operated by the processor and adapted to:
receive one or more input factors associated with scrolling behavior of a user, and
select, based on at least one of the one or more input factors, a scrolling algorithm out of a plurality of scrolling algorithms, the plurality of scrolling algorithms including: (1) a tunable scrolling algorithm and (2) one or more non-linear scrolling algorithms of a plurality of non-linear scrolling algorithms for use in evaluating the scrolling behavior of the user.

9. The apparatus of claim 8, wherein the one or more input factors are selected from the group consisting of a length of a list to be scrolled, a time of a scrolling motion, a direction of the scrolling motion, an input movement speed, a movement direction, and descriptive metadata about contents to be scrolled.

10. The apparatus of claim 8, wherein the tunable scrolling algorithm is capable of adjusting at least one of a scrolling speed, a scrolling sensitivity, and a scrolling time period.

11. The apparatus of claim 8, wherein the scrolling agent is further adapted to evaluate the scrolling behavior of the user, including outputting units of displayable scroll movement based on inputting received units of scroll input to the selected at least one algorithm.

12. The apparatus of claim 8, wherein the at least one algorithm is selected by a learning algorithm, the learning algorithm capable of predicting the scrolling behavior of the user.

13. The apparatus of claim 12, wherein the scrolling agent is further adapted to receive, by the learning algorithm, the one or more input factors as variables capable of modifying the predicted scrolling behavior predicted by the learning algorithm.

14. The apparatus of claim 8, wherein the scrolling agent is a user-level component of an operating system of the apparatus, and the apparatus further comprises an adaptive engine of a device driver of the apparatus, the adaptive engine coupled to the scrolling agent, operated by the processor, and adapted to register units of scroll input.

15. The apparatus of claim 8, wherein the scrolling behavior is associated with the user's use of one or more of a computer mouse, a keyboard, a scroll wheel, a remote control, a touch pad, and a touch sensitive display.

16. The apparatus of claim 8, wherein the scrolling agent is stored in a selected one of an application specific integrated circuit of the apparatus and a microcontroller of the apparatus, and the application specific integrated circuit/microcontroller is communicatively coupled to one or more device drivers of the apparatus.

17. An article of manufacture comprising:
a storage medium; and
a plurality of programming instructions stored on the storage medium and adapted to program an apparatus to enable the apparatus to:
receive one or more input factors associated with scrolling behavior of a user, and select, based on at least one of the one or more input factors, a scrolling algorithm out of a plurality of scrolling algorithms, the plurality of scrolling algorithms including: (1) a tunable scrolling algorithm and (2) one or more non-linear scrolling algorithms of a plurality of non-linear scrolling algorithms for use in evaluating the scrolling behavior of the user.

18. The article of claim 17, wherein the one or more input factors are selected from the group consisting of a length of a list to be scrolled, a time of a scrolling motion, a direction of the scrolling motion, an input movement speed, a movement direction, and descriptive metadata about contents to be scrolled.

19. The article of claim 17, wherein the tunable scrolling algorithm is capable of adjusting at least one of a scrolling speed, a scrolling sensitivity, and a scrolling time period.

20. The article of claim 17, wherein the programming instructions are further adapted to program the apparatus to evaluate the scrolling behavior of the user, including outputting units of displayable scroll movement based on inputting received units of scroll input to the selected at least one algorithm.

\* \* \* \* \*